June 9, 1953     L. W. HUSSEY     2,641,705
STABILIZED OSCILLATOR
Filed Dec. 4, 1946

INVENTOR
L. W. HUSSEY
BY P. J. Roche
ATTORNEY

Patented June 9, 1953

2,641,705

UNITED STATES PATENT OFFICE 2,641,705

STABILIZED OSCILLATOR

Luther W. Hussey, Madison, N. J., assignor to Bell Telephone Laboratories, Incorporated, New York, N. Y., a corporation of New York Application December 4, 1946, Serial No. 714,089

9 Claims. (Cl. 250—36)

This invention relates to a thermistor oscillation generator, and more specifically to an arrangement for stabilizing the amplitudes of the oscillations of such generator.

An object of the invention is to provide substantially uniform oscillations.

In a known type of thermistor oscillation generator, a direct-current bias applied to a thermistor enables the generation of oscillations at a frequency determined by a tuned network included in a load circuit. These oscillations tend to have irregular amplitudes.

In accordance with the present invention, the oscillations of a thermistor oscillation generator are utilized to control automatically the amount of bias applied to the thermistor in response to changes in the amplitudes of the generated oscillations for the purpose of stabilizing the amplitudes of the generated oscillations.

In a specific embodiment of the present invention, an automatic bias control for the thermistor comprises a Wheatstone bridge having four resistance arms, one diagonal connected to the source of biasing current, and the opposite diagonal connected across the thermistor whose bias is to be controlled. A sluggish thermistor is interposed in one bridge arm. The load circuit and a tuned network for determining the frequency of the generated oscillations are connected to the opposite diagonal in series with the thermistor whose bias is to be controlled. The inductor of the tuned network is positioned as a heater in proximity of the sluggish thermistor for varying the thermal condition thereof.

At the oscillation frequency, the magnitude of the bias supplied to the thermistor, whose bias is to be controlled, is determined by the amount of the resistance unbalance of the bridge. The sluggish thermistor constitutes a variable resistance whose value, and therefore, the degree of resistance unbalance in the bridge, is determined by its temperature which is controlled by the amplitude of the oscillations present in the inductance of the tuned network connected in the load circuit. As a consequence, slight changes in the amplitude of the oscillations flowing in this inductance tend to effect relatively large changes in the amount of biasing current supplied to the thermistor whose bias is to be controlled, whereby the amplitude of the generated oscillations tends to be stabilized.

The present invention will be readily understood from the following detailed description taken together with the accompanying drawing in which.

Thermistors, which are resistors having a high temperature coefficient of resistance, are well known as disclosed in the patent of R. O. Grisdale, No. 2,258,646, issued October 14, 1941. In electrical circuits, thermistors have been (a) directly and (b) indirectly heated. A directly heated thermistor has its temperature and thereby its effective resistance varied by the current flowing through it. An indirectly heated thermistor has its temperature and thereby its effective resistance varied by the current bowing through its heating coil. Thermistors are also characterized as (c) high speed or fast and (d) slow speed or sluggish. A high speed thermistor possesses such small thermal mass that it changes its effective resistance substantially instantaneously in response to sudden changes in the amount of current flowing through it. A sluggish thermistor includes such large thermal mass that it does not change its effective resistance instantaneously with sudden changes in the amount of current flowing in it, or its heating coil as the case may be. Essentially, a high speed thermistor involves no substantial time-lag in its controlling effect whereas a sluggish thermistor involves a time-lag in its controlling effect.

Figure 1:
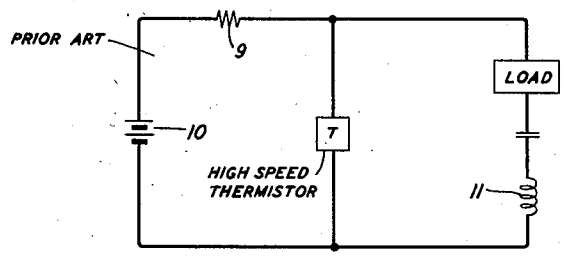
Fig. 1 represents a known type of thermistor oscillation generator.

Fig. 1 shows a known form of oscillation generator comprising a thermistor T having a negative temperature coefficient of resistance, a source 10 of direct current, a tuned circuit 11, and a load circuit. The thermistor T is so biased as to exhibit an effective negative resistance lying at a preselected point on its negatively sloping voltage-current characteristic. A resistor 9 of sufficiently high effective resistance connected in series with the source 10 tends to provide the thermistor T with such amount of bias that the effective resistance of this thermistor tends to be maintained at the preselected point on its negative characteristic. As is well known, the circuit of Fig. 1 oscillates at a frequency determined by the tuned circuit 11.

Figure 2:
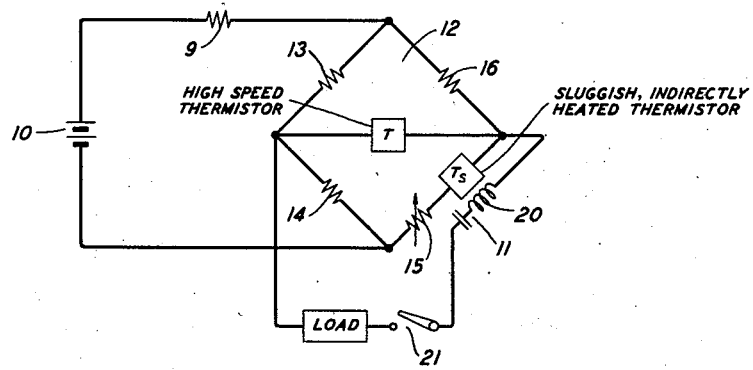
Fig. 2 illustrates a specific embodiment of the invention utilized with the known oscillation generator of Fig. 1.

Fig. 2 comprises Fig. 1 modified in accordance with a specific embodiment of the present invention, and includes corresponding elements identified in both figures with the same reference numerals. A Wheatstone bridge 12 comprising three fixed resistance arms 13, 14 and 16 and an adjustable resistance arm 15 has one diagonal connected to the serially joined direct-current source 10 and resistor 9, and the opposite diagonal to the thermistor T. A second thermistor $T_s$ having a negative temperature coefficient of resistance is connected in series with the adjustable resistor 15 in the one bridge arm.

Connected across the opposite bridge diagonal in series with the thermistor T are the serially connected load and tuned circuit whose inductance 20 is positioned in proximity of the thermistor $T_s$ for the purpose of varying the temperature of the latter thermistor in a manner that will presently appear. A single pole single throw switch 21 is interposed between the load and tuned circuit in Fig. 2. The thermistor T is a high speed type, the thermistor $T_s$ is a sluggish type.

In the operation of Fig. 2, let it be initially assumed that the switch 21 is opened to interrupt the flow of oscillating current in the load; and that the magnitudes of the voltage of the direct current source and of the effective resistance of the respective bridge arms are so proportioned that the bridge is unbalanced to a predetermined extent $\Delta(>0)$. This serves to supply such amount of direct current bias to the thermistor T as to cause the latter to exhibit an effective negative resistance lying at a preselected point on its negatively sloping voltage-current characteristic, and to the thermistor $T_s$ as to cause the effective resistance of the latter to lie near its most critical value.

The effective resistance of the load circuit is substantially less than that of the respective bridge arms so that when the switch 21 is closed, a relatively large amount of the oscillating current flows in the tuned circuit 11 including the inductance 20 thereof. Now the circuit of Fig. 2 is caused to oscillate at the frequency determined by the tuned circuit 11. The oscillating current flowing in the inductance 20 tends to vary the temperature of the thermistor $T_s$ and thereby to change its effective resistance. In this connection it is understood that the inductance 20 possesses sufficient resistance that it is heated by the oscillating current flowing through it, and further that it is the heat generated by the inductance 20 that tends to vary the temperature of thermistor $T_s$. Alternately, the well-known heater resistance could be connected in series with the inductance 20 and positioned in proximity of the thermistor $T_s$ and used for heating the latter instead of the inductance 20. This tends to decrease the unbalance $\Delta$ of the bridge causing the latter to approach more closely, but not attain, the condition of balance.

It will be understood that when the bridge was unbalanced to the predetermined extent $\Delta$, the optimum amount of direct-current bias from the source 10 in Fig. 2 was being supplied to the thermistor T. This caused the thermistor T to operate at such point on its negative resistance characteristic that the oscillations generated by the circuit of Fig. 2 tended to possess their maximum amplitudes. As the predetermined extent $\Delta$ of bridge unbalance tends to be reduced by decreasing the bridge unbalance in the manner previously explained, the amount of biasing current supplied to the thermistor T by the source 10 also tends to be reduced. This tends to shift the operating point on the negative characteristic of thermistor T in such sense that the amplitudes of the oscillations generated by the circuit of Fig. 2 tends to be reduced. At no time, however, do the amplitudes of the oscillations generated by the circuit of Fig. 2 build up to the magnitude at which the bridge would tend to be balanced ($\Delta=0$) and thereby cut off the biasing current of the source 10 from the thermistor T. As a consequence, the amplitudes of the generated oscillations tend to be stabilized. When the constants of Fig. 2 are so proportioned that the amplitudes of the generated oscillations tend to be maintained at relatively small values, the generated oscillations will tend to approach a sine wave.

What is claimed is:

1. In combination with an oscillation generator including an element having a preselected resistance characteristic, a source of direct current for biasing said element to a certain point on said characteristic whereby oscillations are generated, a load having a tuned network for utilizing the generated oscillations, means including a thermally variable resistor to connect said element, and load in a series circuit to said source for stabilizing the amplitudes of the generated oscillations, said resistor being responsive to the generated oscillations for changing its effective resistance and thereby varying the amount of direct current supplied to said element to tend to stabilize the amplitudes of the generated oscillations.

2. In an oscillation generator, a resistor having a negative temperature coefficient of resistance, a source of direct current, a load including a tuned network, a Wheatstone bridge, said source being connected to one bridge diagonal, said resistor being connected to the opposite bridge diagonal, said load and network being connected across the opposite bridge diagonal in series with said resistor, and a further resistor having a preselected temperature coefficient of resistance interposed in one arm of said bridge.

3. An oscillation generator comprising an element having a certain resistance characteristic, a source of direct current, a load, a tuned network in said load, a Wheatstone bridge, said source being connected across one bridge diagonal, said element being connected across the opposite bridge diagonal, said load being connected across the opposite bridge diagonal in parallel relation to said element, and thermally responsive means connected in said bridge and heated by the generated oscillations.

4. A generator according to claim 3 in which said tuned network includes an inductance, and said thermally responsive means comprises a thermally variable resistor interposed in one arm of said bridge, said inductance being positioned in proximity of said resistor.

5. An electrical circuit for generating oscillations comprising a resistor having a negative resistance characteristic, a source of direct current, a load circuit, a frequency determining network included in said load circuit, said network having an inductance, a Wheatstone bridge having four resistance arms, said resistor being connected across one bridge diagonal, said source being connected across the opposite bridge diagonal, said load circuit and network being connected to said one bridge diagonal in series with said resistor, and a thermally variable resistor interposed in series with the resistance of one arm of said bridge, said inductance varying the thermal condition of said variable resistor.

6. An oscillation generator comprising a resistor having a certain resistance characteristic, a source of direct current for biasing said resistor, a load circuit, a frequency determining network having an inductance included in said load circuit, a Wheatstone bridge circuit proportioned to possess a small unbalance for controlling the biasing current supplied to said resistor by said source, said bridge circuit also coupling said resistor to said load and network in series relation, and a thermally variable resistor interposed in one arm of said bridge circuit, said inductance being positioned in proximity of said variable resistor, said last resistor operating to decrease the unbalance of the bridge circuit in response to the oscillations in said inductance whereby the amplitudes of the generated oscillations tend to be stabilized.

7. An electrical circuit for generating oscillations comprising a first resistor having a certain negative temperature coefficient resistance, a source of direct current for biasing said first resistor to a preselected point on its negative characteristic whereby oscillations are generated, a load, a tuned network included in said load for determining the frequency of the generated oscillations, said network having an inductance, and means for stabilizing the amplitudes of the generated oscillations, said means comprising a Wheatstone bridge arranged with a predetermined unbalance for controlling the amount of biasing current supplied by said source to said first resistor, said bridge also coupling said first resistor to said load, and a second resistor having a negative temperature coefficient of resistance interposed in one arm of said bridge, said inductance being positioned in proximity of said second resistor, said last resistor changing its effective resistance in response to the generated oscillations flowing in said inductance and thereby tending to decrease the unbalance condition of said bridge for controlling the biasing current supplied to said first resistor by said source to stabilize the amplitudes of the generated oscillations.

8. An oscillation generating circuit comprising a negative impedance element, a load circuit, a tuned network included in said load circuit for fixing the frequency of the generated oscillations, circuit means for connecting said element, load circuit and tuned network in series relation, a source of biasing current connected to said element, the negative impedance of said element being substantially dependent on the strength of the said biasing current supplied to it, and means for stabilizing the generated oscillations comprising a thermally responsive resistance connected to control the strength of the biasing current supplied to said negative impedance element, and heater means for said thermally responsive element, said heater means being included in said circuit means and energized by the generated oscillations.

9. In an oscillation generator, a resistor having a negative temperature coefficient resistance, a source of direct current, a tuned load network for determining the frequency of the generated oscillations, means including a Wheatstone bridge having said resistor and source connected to different bridge diagonals respectively for varying the amount of current supplied by said source to said resistor, said load network being connected in parallel with said resistor, and a thermally responsive element connected in said means and heated by the generated oscillations for controlling the unbalance of said bridge thereby varying the amount of current supplied by said source to said resistor.

LUTHER W. HUSSEY.

References Cited in the file of this patent

UNITED STATES PATENTS

| Number | Name | Date |
|---|---|---|
| 1,590,420 | Chubb | June 29, 1926 |
| 1,901,741 | Fetch, Jr. | Mar. 14, 1933 |
| 2,258,128 | Black | Oct. 7, 1941 |
| 2,278,633 | Bagnall | Apr. 7, 1942 |
| 2,406,804 | Chatterjea | Sept. 3, 1946 |